May 19, 1970 J. C. BERNEY 3,513,330

ELECTRONIC FREQUENCY DIVIDER

Filed Nov. 21, 1966 2 Sheets-Sheet 2

United States Patent Office 3,513,330

Patented May 19, 1970

3,513,330

ELECTRONIC FREQUENCY DIVIDER

Jean Claude Berney, Lausanne, Switzerland, assignor to Bernard Golay S.A., Lausanne, Switzerland Filed Nov. 21, 1966, Ser. No. 595,915
Claims priority, application Switzerland, June 16, 1966, 8,728/66
Int. Cl. H03k 21/00
U.S. Cl. 307—225 3 Claims

ABSTRACT OF THE DISCLOSURE

An electronic frequency divider is described. Circuit components include solid state devices with cross-connected transistors having a negative resistance characteric and a RC network in the emitter circuit of an input transistor.

The present invention is directed to frequency divider of small power drain, comprising at least one dividing stage to which are applied unipolar impulses of the frequency to be divided.

Various types of electronic frequency dividers are known comprising, for example, a series of transistorized bistable circuits or a coil having a ferrite core which is saturated by successive impulses. Such dividers, while suitable for the conditions required in their various fields of application, however, are not practical for operation in devices having tiny sources of energy, limited in size, which are not easily replaceable, as for example those used in watches.

The present invention has for its object to provide a frequency divider having a high division rate while consuming only a small amount of energy, and which is capable of operating from a voltage source of less than 1 volt.

The frequency divider according to the invention, is characterised by the fact that the division stage comprises a discriminator having: a negative resistance, an active synchronizing element and a RC time base. The discriminator acts as an interrupter allowing current flow only within the first impulse and during the $n^{th}$ impulse in the case of a division in the ratio of $1/n$.

The accompanying drawing represents by way of example one embodiment and two modifications of the invention.

Figure 1:
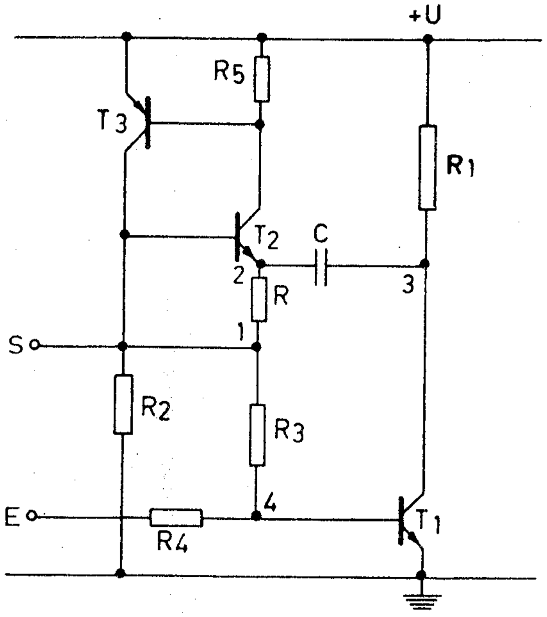
FIG. 1 shows the electrical circuit of one stage of a frequency dividing stage.

The divider stage shown in FIG. 1 comprises a device T1 operating as a switching transistor, the emitter of which is connected directly to ground and the collector to the supply voltage +U between resistance R1. The input impulses I are applied through terminal E to the base of transistor T1 through a resistance R4 limiting the current of base transistor T1. The base of transistor T1, point 4 of the circuit, is connected through a resistance R3, to point 1 directly connected to the output S on which appear output impulses of the divider stage. This point 1 is the middle point of the voltage divider formed by a resistance R2, connected to the ground and a resistance R of much higher value forming a part of time base RC. The connecting point 2 of condenser C and of a resistance R is connected to the emitter of a NPN transistor T2 the base of which is connected to the connector of complementary PNP transistor, T3, the base of this last transistor being directly connected to the collector of the transistor T2. The base of transistor T2 is connected to the ground through resistance R2, while its collector is connected to the supply voltage +U through a resistance R5. The emitter of transistor T3 is connected directly to the supply voltage +U. Transistors T2 and T3 are connected so as to form a voltage discriminator having a characteristic of which at least a part has a negative resistance.

Figure 2:
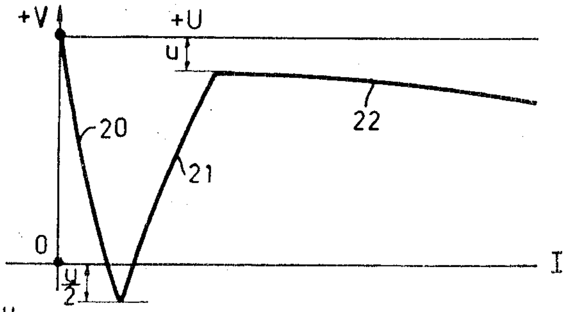
FIG. 2 shows the characteristic of the combination T2–T3.

The characteristic of combination T2–T3 is given by way of reference to FIG. 2. This characteristic is that of a three way switch. One the abcissa is shown current I and on the ordinate the supply voltage +V. This characteristic comprises three distinct parts: a substantially linear portion 20, the steep slope of which corresponds to the blocking resistance of the interrupter at the triggering point O. The current through the interrupter is first negative and less than 1 micro-ampere. Transistor T3 is non-conducting, while transistor T2 is slightly positively polarized by the residual current of the collector of transistor T3. When the voltage of point 2 reaches a value equal to $$-\frac{u}{2}$$

$u$ being equal to the diode voltage of transistors T2 and T3, transistor T3 conducts and its emitter current increases. T2 conducts and the current through switching transistors T2–T3 increases, while the voltage between collector-emitter of transistor T2 decreases. This process, corresponding to the curve 21 of the diagram, is maintained until the current passing through the switching transistors reaches its maximum value, and remains constant, the voltage at point 2 decreasing to value $u$. At this instant, transistors T2 and T3 are saturated. Curve 22 of the diagram corresponds to the resistance of the switching transistor in the closed position.

In one embodiment, the resistances have the following values:

$$R=560K\Omega$$
$$R1=22K\Omega$$
$$R3=R2=R4=10K\Omega$$
$$R5=33K\Omega$$

Figure 3:
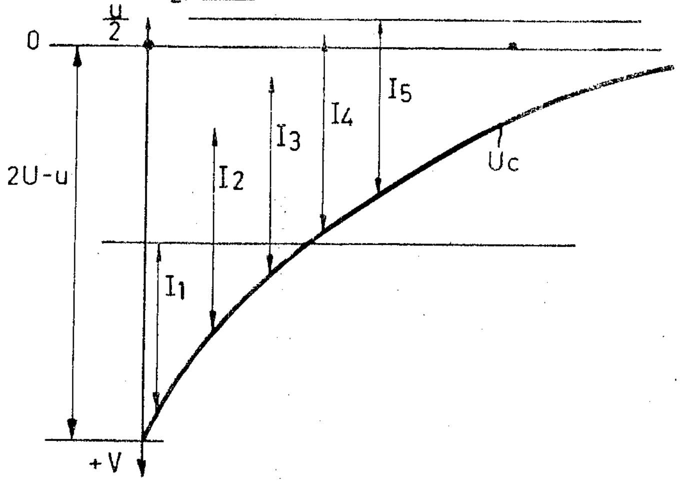
FIG. 3 shows a diagram of the voltage at point 2 of FIG. 1.

Let us suppose that there is applied a positive impulse to input E. This impulse, renders transistor T1, conducting and causes the voltage at point 3 to fall from +U to zero. A negative impulse, —U, is thus applied by condenser C to point 2. This impulse, greatly superior to the threshold voltage of the switching transistors T2–T3, closes this circuit, and the voltage at point 2, U2, increases abruptly to $U-u$, while the potential at point 3 is maintained at zero by transistor T1 conducting through R1. The voltage at the terminals of condenser C becomes equal to $U-u$. As soon as condenser C is charged, switching circuit T2–T3 opens the circuit and voltage U3 at point 3 increases again to +U, the transistor T1 being again non-conductive. Impulse +U is then transmitted through condenser C to point 2 the voltage of which, U2, becomes then equal to $U-u+U=2U-v$ At this moment, the divider is triggered and the condenser tends to discharge through resistances R, R1 and R2, voltage U3 falling exponentially toward zero, curve Uc of the diagram of FIG. 3. During this time, the positive impulses continue to arrive at the frequency to be divided on input E of the divider stage. Each of these impulses puts into operation transistor T1, the voltage at point 3 periodically going down to zero, and successive impulses I, I2, I3, I4 having the value —U, are applied by the condenser C at point 2, and superimpose themselves on voltage Uc, until the moment when an impulse I5 reaches the threshold of triggering, of interrupter T2, T3, switching transistors which becoming conductive, produce an output impulse +U on output S. It will be understood that the dividing rates have been arbitrarily selected to be equal to ⅕. The same could have a much lower value.

In the absence of impulses I2, I3, etc., voltage U3 at point 3 has the following value:

$$U3=Uc=(2U-u)e^{\frac{-t}{RC}}$$

This voltage is always greater to $-u/2$ in such a way that the divider never triggers.

In the presence of impulses, the voltage of point 3 is equal to:

$$U3=(2U-u)e^{\frac{-t}{RC}}-U$$

The equation:

$$(2U-u)e^{\frac{-t}{RC}}-U=-\frac{u}{2}$$

has a real solution, which signifies that for a certain value $t$, voltage U3 becomes less than voltage $-u/2$ and that the divider triggers, furnishing an output impulse.

In solving this equation there is obtained:

$$e^{\frac{-t}{RC}}=\frac{U-\frac{u}{2}}{2U-u}=\frac{1}{2}$$

from which it appears that the dividing ratio is independent of the supply voltage.

The outlet impulse at point S may be directly applied to a following divider stage which may be analogous to the stage shown on FIG. 1.

The circuit described may be used within wide limits regardless of the power consumption, the frequency, the voltage or the desired division ratio. It is thus possible to provide, in an integrated form, a universal control circuit which, associated with a RC circuit, permits to obtain a frequency divider applicable in the watch-making field, for example, in quartz chronometers, measuring devices for watches and, even in electronic watches, as well as in all other apparatus having only a limited energy source.

Figure 4:
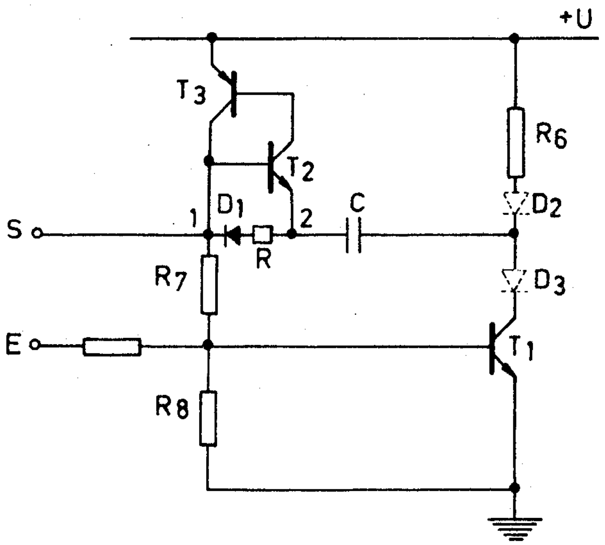
FIG. 4 shows a modification of the circuit of FIG. 1.

A first modification of this divider is shown on FIG. 4. The circuit comprises only three resistances R6, R7 and R8 and also one or two diodes D1, or D2 or D3 for to compensate the variation in feed voltage U. Aside from this, the circuit operates in the same manner as the circuit shown in FIG. 1.

Figure 5:
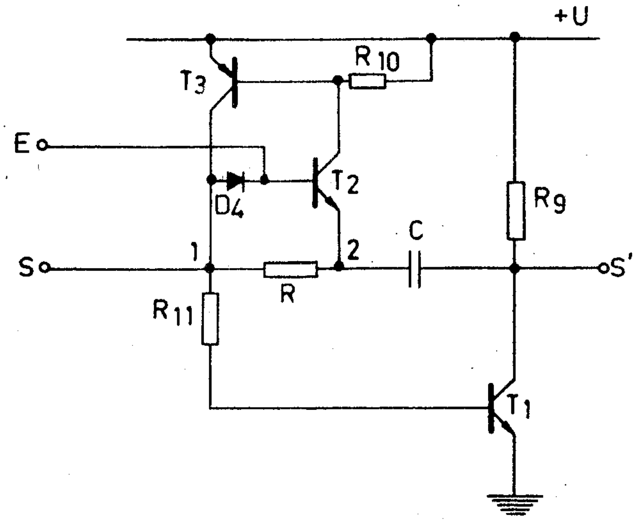
FIG. 5 shows a second modification of the circuit of FIG. 1.

The second modification is shown on FIG. 5, in which the positive input impulses are applied to the base of transistor T2, which is separated from output S by a diode D4, in order to obtain positive output pulses on output S or negative ones on output S'. In this modification, transistor T1 remains inoperative after the first input pulse and is only made conductive by switching transistors T2–T3. The latter is made conductive only when the voltage applied to the base of transistor T1 is greater than the voltage of point 2 which falls exponentially.

Transistors T2 and T3 can naturally be replaced by a single equivalent PNPN transistor.

The described divider and modifications thereof will operate with a supply voltage of less than 1 volt. Thus a battery of 1.5 or 1.35 volts is suitable.

What is claimed is:

1. A frequency divider for operation of supply potentials of very low value comprising an input transistor having an emitter at ground potential and a collector connected to the supply potential in series with load resistor, an input terminal connected to the base of said transistor, a circuit between said collector and said base comprising in series a capacitor and first and second resistors, the junction point of said resistors being connected to the output terminal of said divider, a pair of cross connected PNP-NPN switching transistors exhibiting a negative resistance characteristic in their conductivity, one of said transistors having its emitter connected to the high potential side of said supply line and its collector to the output terminal in series with a resistance terminating at ground potential, said other transistor having its emitter connected to the junction point of said capacitor and said first resistor and its collector to the high potential side of said supply line in series with a resistor.

2. A frequency divider in accordance with claim 1 wherein said first resistor connected to said capacitor is of large value compared to said second resistor in series relation therewith connected to the base of said input transistor.

3. A frequency divider in accordance with claim 1 wherein a current limiting resistor is connected between the input terminal and the base of said input transistor.

References Cited

UNITED STATES PATENTS

| | | | |
|---|---|---|---|
| 3,031,621 | 4/1962 | Schreiner | 307—225 X |
| 3,037,132 | 5/1962 | Skerritt | 307—273 X |
| 3,061,742 | 10/1962 | Harrison | 307—225 |
| 3,204,123 | 8/1965 | Mahoney et al. | 307—274 X |
| 3,309,528 | 3/1967 | Ziegler | 307—274 X |
| 3,378,697 | 4/1968 | Preston et al. | 307—225 |

DONALD D. FORRER, Primary Examiner

J. D. FREW, Assistant Examiner

U.S. Cl. X.R.

307—220, 226, 252, 255, 273, 274